UNITED STATES PATENT OFFICE.

LOUIS DESTREE, OF HAREN, BELGIUM.

PROCESS OF MAKING ALKALI THIOSULFATES.

961,760.   Specification of Letters Patent.   Patented June 21, 1910.

No Drawing.   Application filed April 10, 1909.   Serial No. 489,052.

*To all whom it may concern:*

Be it known that I, LOUIS DESTREE, a subject of Belgium, residing at Haren, Belgium, have invented new and useful Improvements in Processes of Making Alkaline Thiosulfates, of which the following is a specification.

This invention relates to a process for the manufacture of very pure thiosulfates in solutions sufficiently concentrated to render additional evaporation or concentration superfluous.

It consists broadly in the preparation of alkali thiosulfates by the action of alkali bisulfites upon alkali disulfids.

Among all the known processes for the production or preparation of thiosulfates, there is only the process in which sulfur is added to an alkali sulfite which results in the formation of thiosulfates as the sole final product in accordance with the equation:—

$$R_2SO_3 + S = R_2S_2O_3.$$

The other methods of preparation by the action of sulfurous anhydrid upon sulfids and hydrosulfids give in addition to the thiosulfates a precipitate of sulfur in accordance with the following reactions:—

$$2R_2S + 3SO_2 = 2R_2S_2O_3 + S$$
$$2RSH + 2SO_2 = R_2S_2O_3 + S_2 + H_2O.$$

The present process is differentiated from these known processes in this respect: the conversion into thiosulfates is not attended with the formation of compounds other than water and, consequently, the product obtained reaches the maximum of purity. In addition, the reaction is very sharp.

The disulfids can be obtained by dissolving the necessary quantity of sulfur in the mono-sulfids or by forming appropriate mixtures of mono-sulfids and polysulfids, or in any other known manner; the bisulfites employed are obtained by known methods.

The reaction is as follows:—

$$2Na_2S_2 + 6NaHSO_3 = 5Na_2S_2O_3 + 3H_2O.$$

Example: To a solution containing 22 grams of sodium disulfid ($Na_2S_2$) is added 62.4 grams of liquid sodium bisulfite ($NaHSO_3$) of 36° to 42° Baumé. The mixture is heated to 60° C. and a yield of 124 grams of crystallized sodium thiosulfate ($Na_2S_2O_3$) with 5 equivalents of water is obtained.

Having thus described my invention what I claim and desire to secure by Letters Patent of the United States is:—

1. The described process of obtaining alkali thiosulfates by the action of alkali bisulfites upon alkali disulfids.

2. The described process for the conversion of alkali disulfids into alkali thiosulfates by the action thereupon of alkali bisulfites.

In testimony whereof I have affixed my signature in presence of two subscribing witnesses.

LOUIS DESTREE.

Witnesses:
  W. KIRKPATRICK,
  JAMES M. G. FAY.